United States Patent
Zhi et al.

(10) Patent No.: US 11,075,406 B2
(45) Date of Patent: Jul. 27, 2021

(54) GEL POLYMER ELECTROLYTES COMPRISING ELECTROLYTE ADDITIVE

(71) Applicant: City University of Hong Kong, Kowloon (HK)

(72) Inventors: Chunyi Zhi, Shatin (HK); Minshen Zhu, Sha Tin (HK); Zijie Tang, Hong Kong (HK)

(73) Assignee: City University of Hong Kong, Kowloon (HK)

( * ) Notice: Subject to any disclaimer, the term of this patent is extended or adjusted under 35 U.S.C. 154(b) by 30 days.

(21) Appl. No.: 15/918,946

(22) Filed: Mar. 12, 2018

(65) Prior Publication Data
US 2019/0140317 A1  May 9, 2019

Related U.S. Application Data

(63) Continuation-in-part of application No. 15/805,817, filed on Nov. 7, 2017, now Pat. No. 10,446,840.

(51) Int. Cl.
*H01M 10/0565* (2010.01)
*H01M 10/0525* (2010.01)
(Continued)

(52) U.S. Cl.
CPC ......... *H01M 10/0565* (2013.01); *C08J 3/075* (2013.01); *C08J 5/20* (2013.01);
(Continued)

(58) Field of Classification Search
CPC ......... H01M 10/0565; H01M 10/0525; H01M 10/0562; C08L 101/06; C08L 101/025;
(Continued)

(56) References Cited

U.S. PATENT DOCUMENTS 2,647,938 A * 8/1953 Taylor ............... H01M 6/22
429/303
4,306,061 A   12/1981 Majewicz
(Continued)

FOREIGN PATENT DOCUMENTS

CN   104240973 A   12/2014
CN   105845972 A   8/2016
(Continued)

OTHER PUBLICATIONS

Zeng et al. "Achieving Ultrahigh Energy Density and Long Durability in a Flexible Rechargeable Quasi-Solid-State Zn—MnO2 Battery." Adv. Mater. 2017, 29, 1700274 (Year: 2017).*
(Continued)

*Primary Examiner* — Michael L Dignan
(74) *Attorney, Agent, or Firm* — Norton Rose Fulbright US LLP

(57) ABSTRACT

Systems and methods which provide an aqueous gel polymer electrolyte having one or more additive therein selected to configure the aqueous gel polymer electrolyte, and batteries formed therewith, for improved performance are described. Aqueous gel polymer electrolytes may, for example, have an additive compound including boron (e.g., a borate ion-containing salt) therein to configure batteries formed using the aqueous gel polymer electrolyte to increase the ionic conductivity of the gel polymer electrolyte. The addition of borax in Zinc-ion battery gel electrolytes of embodiments is configured to enhance the dissociation of zinc ions and anions, and subsequently release more mobile zinc ions. Furthermore, the interaction between borax and divalent transition metal (Zn) in electrolyte according to embodiments may enhance the transportation of mobile zinc ions.

12 Claims, 6 Drawing Sheets

(51) Int. Cl.
| | |
|---|---|
| H01M 10/0562 | (2010.01) |
| C08L 101/06 | (2006.01) |
| C08J 3/075 | (2006.01) |
| C08L 101/02 | (2006.01) |
| H01M 10/054 | (2010.01) |
| C08J 5/20 | (2006.01) |
| C01G 9/08 | (2006.01) |
| C01B 15/12 | (2006.01) |
| C01G 9/02 | (2006.01) |

(52) U.S. Cl.
CPC ......... *C08L 101/025* (2013.01); *C08L 101/06* (2013.01); *H01M 10/054* (2013.01); *H01M 10/0525* (2013.01); *H01M 10/0562* (2013.01); *C01B 15/12* (2013.01); *C01G 9/02* (2013.01); *C01G 9/08* (2013.01); *C08L 2203/20* (2013.01)

(58) Field of Classification Search
CPC ...... C08L 2203/20; C08J 3/075; C01B 15/12; C01G 9/02; C01G 9/08
See application file for complete search history.

(56) References Cited

U.S. PATENT DOCUMENTS

| | | | | |
|---|---|---|---|---|
| 5,215,836 | A * | 6/1993 | Eisenberg | H01M 10/26 429/199 |
| 8,663,844 | B2 * | 3/2014 | Kang | H01M 4/42 429/188 |
| 8,940,434 | B2 | 1/2015 | Khasanov et al. | |
| 9,620,770 | B2 | 4/2017 | Takasaki et al. | |
| 2003/0068559 | A1 | 4/2003 | Armstrong et al. | |
| 2003/0165744 | A1 | 9/2003 | Schubert et al. | |
| 2005/0153208 | A1 | 7/2005 | Konishiike et al. | |
| 2008/0008937 | A1 | 1/2008 | Eylem et al. | |
| 2013/0130112 | A1 | 5/2013 | Chung et al. | |
| 2013/0149580 | A1 | 6/2013 | Kim | |
| 2013/0244101 | A1 * | 9/2013 | Meckfessel Jones | H01M 2/1626 429/206 |
| 2014/0050990 | A1 | 2/2014 | Yuan et al. | |
| 2014/0205909 | A1 * | 7/2014 | Yonehara | H01M 4/42 429/302 |
| 2015/0372270 | A1 | 12/2015 | Johns | |
| 2016/0211547 | A1 * | 7/2016 | Hwang | H01M 2/1686 |
| 2016/0301096 | A1 | 10/2016 | Zhamu et al. | |
| 2017/0222272 | A1 | 8/2017 | Takami et al. | |

FOREIGN PATENT DOCUMENTS

| | | |
|---|---|---|
| CN | 106340395 A | 1/2017 |
| EP | 1402593 A1 | 3/2004 |
| EP | 2455997 A1 | 5/2012 |
| KR | 20070009231 A | 1/2007 |

OTHER PUBLICATIONS

Pan et al. "Reversible aqueous zinc/manganese oxide energy storage from conversion reactions." Nature Energy 1, 16039 (2016) (Year: 2016).*

Sinton, Steve. "Complexation Chemistry of Sodium Borate with Poly(vinyl alcohol) and Small Diols. A 11B NMR study." Macromolecules 1987, 20, 2430-2441.) (Year: 1987).*

Lorca et al. "A Review of the Use of GPEs in Zinc-Based Batteries. A Step Closer to Wearable Electronic Gadgets and Smart Textiles." Polymers 2020, 12, 2812. (Year: 2020).*

Lao-atiman et al. "Printed Transparent Thin Film Zn—MnO2 Battery." Journal of the Electrochemical Society 164 (4) A859-A863 (2017). (Year: 2017).*

Iwakura et al. "Charge-discharge characteristics of nickel/zinc battery with polymer hydrogel electrolyte." Journal of Power Sources 152 (2005) 291-294. (Year: 2005).*

Kim, D.-H. et al. "Silicon Electronics on Silk as a Path to Bioresorbable, Implantable Devices." Appl. Phys. Lett., vol. 95, 133701, (2009), 3 pages.

Sun, H. et al. "Large-Area Supercapacitor Textiles with Novel Hierarchical Conducting Structures." Adv. Mater., vol. 28, No. 38, pp. 8431-8438, (2016), 8 pages.

Huang, Y. et al. "Robust Reduced Graphene Oxide Paper Fabricated With a Household Non-Stick Frying Pan: A Large-Area Freestanding Flexible Substrate for Supercapacitors." RSC Adv., vol. 5, No. 43, pp. 33981-33989, (2015), 9 pages.

Lu, X. et al. "Flexible Solid-State Supercapacitors: Design, Fabrication and Applications." Energy Environ. Sci., vol. 7, pp. 2160-2181, (2014), 22 pages.

Yu, D. et al. "Transforming Pristine Carbon Fiber Tows into High Performance Solid-State Fiber Supercapacitors." Adv. Mater., vol. 27, pp. 4895-4901, (2015), 7 pages.

Zhou, G. et al. "Progress in Flexible Lithium Batteries and Future Prospects." Energ. Environ. Sci., vol. 7, pp. 1307-1338, (2014), 32 pages.

Huang, Y. et al. "A Modularization Approach for Linear-Shaped Functional Supercapacitors." J. Mater. Chem. A, vol. 4, No. 12, pp. 4580-4586, (2016), 7 pages.

Sun, H. et al. "Energy Harvesting and Storage in 1D Devices." Nat. Rev. Mater., vol. 2, 17023, (2017), 12 pages.

Wang, X. et al. "Flexible Fiber Energy Storage and Integrated Devices: Recent Progress and Perspectives." Mater. Today, vol. 18, pp. 265-272, (2015), 8 pages.

Kwon, Y. H. et al. "Cable-Type Flexible Lithium Ion Battery Based on Hollow Multi-Helix Electrodes." Adv. Mater., vol. 24, pp. 5192-5197, (2012), 6 pages.

Hoshide, T. et al. "Flexible Lithium-Ion Fiber Battery by the Regular Stacking of Two-Dimensional Titanium Oxide Nanosheets Hybridized with Reduced Graphene Oxide." Nano Lett., vol. 17, No. 6, pp. 3543-3549, (2017), 7 pages.

Fang, X. et al. "A Cable-Shaped Lithium Sulfur Battery," Adv. Mater., vol. 28 (3), pp. 491-496, (2016), 6 pages.

Kou, L. et al. "Coaxial Wet-Spun Yarn Supercapacitors for High-Energy Density and Safe Wearable Electronics." Nat. Commun., vol. 5, 3754, (2014), 10 pages.

Choi, C. et al. "Improvements of System Capacitance Via Weavable Superelastic Biscrolled Yarn Supercapacitors." Nat. Commun., vol. 7, 13811, (2016), 8 pages.

Yu, D. et al. "Scalable Synthesis of Hierarchically Structured Carbon Nanotube-Graphene Fibres for Capacitive Energy Storage." Nat. Nanotechnol., vol. 9, pp. 555-562, (2014), 9 pages.

Shen, Y. W. et al. "The Mechanism of Capacity Fade of Rechargeable Alkaline Maganese Dioxide Zinc Cells." J. Power Sources, vol. 87, pp. 162-166, (2000). 5 pages.

Yu, X. et al. "Flexible Fiber-Type Zinc-Carbon Battery Based on Carbon Fiber Electrodes." Nano Energy, vol. 2, No. 6, pp. 1242-1248, (2013), 7 pages.

Gaikwad, A. M. et al. "Highly Flexible, Printed Alkaline Batteries Based on Mesh-Embedded Electrodes." Adv. Mater., vol. 23, pp. 3251-3255, (2011), 5 pages.

Wang, Z. et al. "Fabrication of High-Performance Flexible Alkaline Batteries by Implementing Multiwalled Carbon Nanotubes and Copolymer Separator." Adv. Mater., vol. 26, pp. 970-976, (2014), 7 pages.

Xu, C. et al. "Energetic Zinc Ion Chemisty: The Rechargeable Zinc Ion Battery." Angew. Chem. Int. Ed., vol. 51, pp. 933-935, (2012), 3 pages.

Pan, H. et al. "Reversible Aqueous Zinc/Manganese Oxide Energy Storage From Conversion Reactions." Nat. Energy, vol. 1, 16039, (2016), 7 pages.

Lee, B. et al. "Electrochemically-Induced Reversible Transition from the Tunneled to Layered Polymorphs of Manganese Dioxide." Sci. Rep., vol. 4, pp. 6066-6074, (2014), 8 pages.

(56) References Cited

OTHER PUBLICATIONS

Alfaruqi, M. H. et al. "A Layered δ-MnO2 Nanoflake Cathode with High Zinc-Storage Capacities for Eco-Friendly Battery Applications." Electrochem. Commun., vol. 60, pp. 121-125, (2015), 5 pages.

Alfaruqi, M. H. et al. "Electrochemically Induced Structural Transformation in a γ-$MnO^2$ Cathode of a High Capacity Zinc-Ion Battery System." Chem. Mater., vol. 27, pp. 3609-3620, (2015), 12 pages.

Huang, Y. et al. "A Polyacrylamide Hydrogel Electrolyte Enabled Intrinsically 1000% Stretchable and 50% Compressible Supercapacitor." Angew. Chem. Int. Ed., vol. 129, (2017), 7 pages.

Choudhury, N. A. et al. "Hydrogel-Polymer Electrolytes for Electrochemical Capacitors: An Overview." Energy Environ. Sci., vol. 2 (1), pp. 55-67, (2009), 13 pages.

Yang, F. et al. "Synthesis, Characterization, and Applied Properties of Carboxymethyl Cellulose and Polyacrylamide Graft Copolymer." Carbohyd. Polym., vol. 78, pp. 95-99, (2009), 5 pages.

Hu, X. et al. "Synthesis and Characterization of a Novel Hydrogel: Salecan/Polyacrylamide Semi-IPN Hydrogel with a Desirable Pore Structure." J. Mater. Chem. B, vol. 2, pp. 3646-3658, (2014), 13 pages.

Ghosh, P. et al. "Studies on Stable Aqueous Polyaniline Prepared with the Use of Polyacrylamide as the Water Soluble Support Polymer." Eur. Polym. J., vol. 35, pp. 803-813, (1999), 11 pages.

Biswal, D. R. et al. "Flocculation Studies Based on Water-Soluble Polymers of Grafted Carboxymethyl Cellulose and Polyacrylamide." J. Appl. Polym. Sci., vol. 102, pp. 1000-1007, (2006), 8 pages.

Biswal, D. R. et al. "Characterisation of Carboxymethyl Cellulose and Polyacrylamide Graft Copolymer." Carbohyd. Polym., vol. 57, pp. 379-387, (2004), 9 pages.

Liu J. et al. "A Flexible Quasi-Solid-State Nickel-Zinc Battery with High Energy and Power Densities Based on 3D Electrode Design." Adv. Mater., vol. 28, 8732-8739, (2016), 8 pages.

Pech, D. et al. "Ultrahigh-Power Micrometre-Sized Supercapacitors Based on Onion-Like Carbon." Nat. Nanotechnol., vol. 5, pp. 651-654, (2010), 4 pages.

Yang, Y. et al. "Waterproof, Ultrahigh Areal-Capacitance, Wearable Supercapacitor Fabrics." Adv. Mater., vol. 29, 1606679, (2017), 9 pages.

Deng, J. et al. "A Shape-Memory Supercapacitor Fiber." Angew. Chem. Int. Ed., vol. 54, pp. 15419-15423, (2015), 5 pages.

You, J. et al. "A Polymer Tandem Solar Cell with 10.6% Power Conversion Efficiency." Nat. Commun., vol. 4, 1446, (2013), 10 pages.

Liu, W. et al. "Solar-Induced Direct Biomass-to-Electricity Hybrid Fuel Cell Using Polyoxometalates as Photocatalyst and Charge Carrier." Nat. Commun., vol. 5, 3208, (2014), 8 pages.

Snyder, G. J. et al. "Complex Thermoelectric Materials." Nat. Mater., vol. 7, pp. 105-114, (2008), 10 pages.

Sun, Y. et al. "Promises and Challenges of Nanomaterials for Lithium-Based Rechargeable Batteries." Nature Energy, vol. 1, 16071, (2016), 12 pages.

Ji, L. et al. "Recent Developments in Nanostructured Anode Materials for Rechargeable Lithium-Ion Batteries." Energy Environ. Sci., vol. 4, pp. 2682-2699 (2011), 18 pages.

Kim, S.-W. et al. "Electrode Materials for Rechargeable Sodium-Ion Batteries: Potential Alternatives to Current Lithium-Ion Batteries." Adv. Energy Mater., vol. 2, pp. 710-721, (2012), 12 pages.

Goodenough, J. B. et al "The Li-Ion Rechargeable Battery: A Perspective." J. Am. Chem. Soc., vol. 135, pp. 1167-1176, (2013), 10 pages.

Wang, X. et al "An Aqueous Rechargeable Zn//$Co_3O_4$ Battery with High Energy Density and Good Cycling Behavior." Adv. Mater., vol. 28, pp. 4904-4911, (2016), 8 pages.

Liu, B. et al. "Hierarchical Three-Dimensional $ZnCo_2O_4$ Nanowire Arrays/Carbon Cloth Anodes for a Novel Class of High-Performance Flexible Lithium-Ion Batteries." Nano Lett., vol. 12, pp. 3005-3011, (2012), 7 pages.

Koo, M. et al "Bendable Inorganic Thin-Film Battery for Fully Flexible Electronic Systems." Nano Lett., vol. 12, pp. 4810-4816, (2012). 7 pages.

Wang, C. et al. "Functionalized Polythiophene-Coated Textile: A New Anode Material for a Flexible Battery." J. Power Sources, vol. 156, pp. 610-614, 2006, 5 pages.

Liu, W. et al. "3D Porous Sponge-Inspired Electrode for Stretchable Lithium-Ion Batteries." Adv. Mater., vol. 28, pp. 3578-3583, (2016), 6 pages.

Huang, Y. et al. "A Self-Healable and Highly Stretchable Supercapacitor Based on a Dual Crosslinked Polyelectrolyte." Nat. Comm., vol. 6, 10310, (2015), 8 pages.

Frenzel, J. et al. "Influence of Ni on Martensitic Phase Transformations in NiTi Shape Memory Alloys." Acta Materialia, vol. 58, pp. 3444-3458, (2010), 15 pages.

Nespoli, A. et al. "The High Potential of Shape Memory Alloys in Developing Miniature Mechanical Devices: A Review on Shape Memory Alloy Mini-Actuators." Sensors and Actuators A: Physical, vol. 158, pp. 149-160, (2010), 12 pages.

Jung, H. et al. "Nanosize Si Anode Embedded in Super-Elastic Nitinol (Ni—Ti) Shape Memory Alloy Matrix for Li Rechargeable Batteries." J. Mater. Chem., vol. 21, pp. 11213-11216, (2011), 4 pages.

Huang, Y. et al. "A Shape Memory Supercapacitor and its Application in Smart Energy Storage Textiles." J. Mater. Chem. A, vol. 4, pp. 1290-1297, (2016), 8 pages.

Li, Y.-Q. et al. "Remarkable Improvements in Volumetric Energy and Power of 3D $MnO_2$ Microsupercapacitors by Tuning Crystallographic Structures," Adv. Funct. Mater., vol. 26, pp. 1830-1839, (2016), 10 pages.

Zhu, M. et al. "Highly Flexible, Freestanding Supercapacitor Electrode with Enhanced Performance Obtained by Hybridizing Polypyrrole Chains with MXene." Adv. Energy Mater., vol. 6, 1600969, (2016), 9 pages.

Huang, Y. et al. "Extremely Stable Polypyrrole Achieved Via Molecular Ordering for Highly Flexible Supercapacitors." ACS Appl. Mater. and Interfaces, vol. 8, pp. 2435-2440, (2016), 6 pages.

Huang, Y. et al. "Enhanced Tolerance to Stretch-Induced Performance Degradation of Stretchable $MnO_2$-Based Supercapacitors." ACS Appl. Mater. and Interfaces, vol. 7, pp. 2569-2574, (2015), 6 pages.

Li, M. et al. "Polypyrrole Nanofiber Arrays Synthesized by a Biphasic Electrochemical Strategy." J. Mater. Chem., vol. 18, pp. 2276-2280, (2008), 5 pages.

Xie, Y. et al. "Electrochemical Capacitance of a Carbon Quantum Dots-Polypyrrole/Titania Nanotube Hybrid." RSC Adv., vol. 5, pp. 89689-89697, (2015), 9 pages.

Kuang, P.-Y. et al. "Anion-assisted One-Pot Synthesis of 1D Magnetic α- and β-$MnO_2$ Nanostructures for Recyclable Water Treatment Application." New J. Chem., vol. 39, pp. 2497-2505, (2015), 9 pages.

Cai, G. et al. "Extremely Stretchable Strain Sensors Based on Conductive Self-Healing Dynamic Cross-Links Hydrogels for Human-Motion Detection." Adv. Sci., vol. 4, 1600190, (2017), 7 pages.

Spoljaric, S. "Stable, Self-healing Hydrogels from Nanofibrillated Cellulose, Poly(Vinyl Alcohol) and Borax Via Reversible Crosslinking" Eur. Polym. J., vol. 56, pp. 105-117, (2014), 41 pages.

Wang, H. et al., "Alternative Multifunctional Cyclic Organosilicon as an Efficient Electrolyte Additive for High Performance Lithium-Ion Batteries." Electrochim. Acta, vol. 254, pp. 112-122, (2017), 11 pages.

Zhang, S.S. "A Review on Electrolyte Additives for Lithium-Ion Batteries." J. Power Sources, vol. 162, pp. 1379-1394, (2006), 16 pages.

Arthur, T. S. et al. "Three-Dimensional Electrodes and Battery Architectures." MRS Bull. vol. 36, pp. 523-531, (2011), 9 pages.

Liu, L. et al. "Advances on Microsized On-Chip Lithium-Ion Batteries." Small, vol. 13, 1701847, (2017), 12 pages.

Zhu, M. S. et al. "Capacitance Enhancement in a Semiconductor Nanostructure-Based Supercapacitor by Solar Light and a Self-Powered Supercapacitor Photodetector System." Adv. Funct. Mater., vol. 26, pp. 4481-4490 (2016), 10 pages.

(56) References Cited

OTHER PUBLICATIONS

Zhu, M. S. et al. "An Electrochromic Supercapacitor and its Hybrid Derivatives: Quantifiably Determining Their Electrical Energy Storage by an Optical Measurement." J. Mater. Chem. A, vol. 3, pp. 21321-21327, (2015), 7 pages.

Zhang, P. P. et al. "Stimulus-Responsive Micro-Supercapacitors with Ultrahigh Energy Density and Reversible Electrochromic Window." Adv. Mater., vol. 29, 1604491 (2017), 7 pages.

Manthiram, A. "An Outlook on Lithium Ion Battery Technology." ACS Central Sci., vol. 3, pp. 1063-1069, (2017). 7 pages.

Kim, H. et al. "Aqueous Rechargeable Li and Na Ion Batteries." Chem. Rev., vol. 114, pp. 11788-11827, (2014), 40 pages.

Sun, W. et al. "$Zn/MnO_2$ Battery Chemistry With $H^+$ and $Zn^{2+}$ Coinsertion." J. Am. Chem. Soc., vol. 139, pp. 9775-9778, (2017), 4 pages.

Zhang, N. et al. "Cation-Deficient Spinel $ZnMn_2O_4$ Cathode in $Zn(CF_3SO_3)_2$ Electrolyte for Rechargeable Aqueous Zn-Ion Battery." J. Am. Chem. Soc., vol. 138, pp. 12894-12901, (2016), 8 pages.

Zhang, N. et al. "Rechargeable Aqueous Zinc-Manganese Dioxide Batteries with High Energy and Power Densities." Nat. Commun., vol. 8, 405, (2017), 9 pages.

Song, Y. et al. "Electrochemical Anchoring of Dual Doping Polypyrrole on Graphene Sheets Partially Exfoliated From Graphite Foil for High-Performance Supercapacitor Electrode." J. Power Sources, vol. 249, pp. 48-58 (2014), 11 pages.

Kundu, D. et al. "A High-Capacity and Long-Life Aqueous Rechargeable Zinc Battery Using a Metal Oxide Intercalation Cathode." Nat. Energy, vol. 1, 16119 (2016), 7 pages.

Suo, L. M. et al. ""Water-in-Salt" Electrolyte Makes Aqueous Sodium-Ion Battery Safe, Green, and Long-Lasting." Adv. Energy Mater., vol. 7, 1701189, (2017), 10 pages.

Yang, C. Y. et al. "Flexible Aqueous Li-Ion Battery with High Energy and Power Densities." Adv. Mater., vol. 29, 1701972 (2017), 8 pages.

Yamada, Y. et al. "Hydrate-Melt Electrolytes for High-Energy-Density Aqueous Batteries." Nat. Energy, vol. 1, 16129, (2016), 9 pages.

Suo, L. M. et al. ""Water-in-Salt" Electrolyte Enables High-Voltage Aqueous Lithium-Ion Chemistries." Science, vol. 350, pp. 938-943, (2015), 6 pages.

Boles, M. A. et al. "Self-Assembly of Colloidal Nanocrystals: From Intricate Structures to Functional Materials." Chem. Rev., vol. 116, pp. 11220-11289 (2016), 70 pages.

Talapin, D. V. et al. "Prospects of Colloidal Nanocrystals for Electronic and Optoelectronic Applications." Chem. Rev., vol. 110, pp. 389-458, (2010), 70 pages.

Gaponik, N. et al. "Thiol-capping of CdTe Nanocrystals: An Alternative to Organometallic Synthetic Routes." J. Phys. Chem. B, vol. 106, pp. 7177-7185, (2002), 9 pages.

Rogach, A. L. et al. "Aqueous Synthesis of Thiol-Capped CdTe Nanocrystals: State-of-the-Art." J. Phys. Chem. C, vol. 111, 14628-14637, (2007), 10 pages.

Kim, J. Y. et al. "25th Anniversary Article: Colloidal Quantum Dot Materials and Devices: A Quarter-Century of Advances." Adv. Mater., vol. 25, pp. 4986-5010 (2013), 25 pages.

Palui, G. et al. "Strategies for Interfacing Inorganic Nanocrystals With Biological Systems Based on Polymer-Coating." Chem. Soc. Rev., vol. 44, pp. 193-227, (2015), 35 pages.

Tang, Q. W. et al. Effect of Surface Manganese Valence of Manganese Oxides on the Activity of the Oxygen Reduction Reaction in Alkaline Media. ACS Catal., vol. 4, pp. 457-463 (2014), 7 pages.

Song, Y. et al. "Pushing the Cycling Stability Limit of Polypyrrole for Supercapacitors." Adv. Funct. Mater., vol. 25, pp. 4626-4632 (2015), 7 pages.

Yuan, X. X. et al. "Improved Performance of Proton Exchange Membrane Fuel Cells with p-Toluenesulfonic Acid-Doped Co—PPy/C as Cathode Electrocatalyst." J. Am. Chem. Soc., vol. 132, pp. 1754-1755 (2010), 2 pages.

Adam, M. et al. "Implementation of High-Quality Warm-White Light-Emitting Diodes by a Model-Experimental Feedback Approach Using Quantum Dot-Salt Mixed Crystals." ACS Appl. Mater. Interfaces, vol. 7, pp. 23364-23371, (2015), 8 pages.

Adam, M. et al. "Colloidal Nanocrystals Embedded in Macrocrystals: Methods and Applications." J. Phys. Chem. Lett., pp. 4117-4123, (2016), 7 pages.

Otto, T. et al. "Colloidal Nanocrystals Embedded in Macrocrystals: Robustness,Photostability, and Color Purity." Nano Lett., vol. 12, pp. 5348-5354 (2012), 7 pages.

Zhang, F. et al. "Brightly Luminescent and Color-Tunable Colloidal $CH_3NH_3PbX_3$ (X=Br, I, Cl) Quantum Dots: Potential Alternatives for DisplayTechnology." ACS Nano, vol. 9, pp. 4533-4542 (2015), 10 pages.

Wang, X. Y. et al. "Surface-Related Emission in Highly Luminescent CdSe Quantum Dots." Nano Lett., vol. 3, pp. 1103-1106, (2003), 4 pages.

Lu, Y. Y. et al. "Stable Cycling of Lithium Metal Batteries Using High Transference Number Electrolytes." Adv. Energy Mater., vol. 5, 1402073 (2015), 7 pages.

Liu, W. et al. "Enhancing Ionic Conductivity in Composite Polymer Electrolytes with Well-Aligned Ceramic Nanowires." Nat. Energy, vol. 2, 17035 (2017), 7 pages.

Hayes, A. C. et al. "Raman Spectroscopic Study of Aqueous $(NH_4)_2SO_4$ and $ZnSO_4$ Solutions." J. Solution Chem., vol. 13, pp. 61-75, (1984), 15 pages.

Liu, W. et al. "Improved Lithium Ionic Conductivity in Composite Polymer Electrolytes with Oxide-Ion Conducting Nanowires." ACS Nano, vol. 10, pp. 11407-11413, (2016), 7 pages.

Wu, Z.-S. et al. "Graphene-Based In-Plane Micro-Supercapacitors with High Power and Energy Densities." Nat. Commun.,vol. 4, 2487 (2013), 8 pages.

El-Kady, M. F. et al. "Scalable Fabrication of High-Power Graphene Micro-Supercapacitors for Flexible and On-Chip Energy Storage." Nat. Commun., vol. 4, 1475 (2013), 9 pages.

Li, L. et al. "High-Performance Pseudocapacitive Microsupercapacitors from Laser-Induced Graphene." Adv. Mater., vol. 28, pp. 838-845 (2016), 8 pages.

Pikul, J. H. et al. "High-Power Lithium Ion Microbatteries From Interdigitated Three-Dimensional Bicontinuous Nanoporous Electrodes." Nat. Commun., vol. 4, 1732 (2013), 5 pages.

Sun, K. et al. "3D Printing of Interdigitated Li-Ion Microbattery Architectures." Adv. Mater., vol. 25, pp. 4539-4543, (2013), 5 pages.

Ning, H. L. et al. "Holographic Patterning of High-Performance On-Chip 3D Lithium-Ion Microbatteries." P. Natl. Acad. Sci. USA, vol. 112, pp. 6573-6578, (2015), 6 pages.

Yu, W. W. et al. "Experimental Determination of the Extinction Coefficient of CdTe, CdSe, and CdS Nanocrystals." Chem. Mater., vol. 15, pp. 2854-2860 (2003), 7 pages.

Huang, Y. et al. "From Industrially Weavable and Knittable Highly Conductive Yarns to Large Wearable Energy Storage Textiles." ACS Nano, vol. 9, pp. 4766-4775, (2015), 29 pages.

Huang, Y. et al. "Weavable, Conductive Yarn-Based NiCo//Zn Textile Battery with High Energy Density and Rate Capability." ACS Nano, vol. 11, pp. 8953-8961, (2017), 9 pages.

Zeng, Y. et al. "Flexible Ultrafast Aqueous Rechargeable Ni//Bi Battery Based on Highly Durable Single-Crystalline Bismuth Nano-Structured Anode." Adv. Mater., vol. 28, pp. 9188-9195, (2016), 8 pages.

Liu, J. L. et al. "A Flexible Alkaline Rechargeable Ni/Fe Battery Based on Graphene Foam/Carbon Nanotubes Hybrid Film." Nano Lett., vol. 14, pp. 7180-7187, (2014), 8 pages.

Wang, G. J. et al. "An Aqueous Rechargeable Lithium Battery Based on Doping and Intercalation Mechanisms." J. Solid State Electrochem, vol. 14, pp. 865-869, (2010), 5 pages.

Lee, D. U. et al. "Self-Assembled $NiO/Ni(OH)_2$ Nanoflakes as Active Material for High-Power and High-Energy Hybrid Rechargeable Battery." Nano Lett., vol. 16, pp. 1794-1802, (2016), 9 pages.

Lee, J. H. et al. "Stabilized Octahedral Frameworks in Layered Double Hydroxides by Solid-Solution Mixing of Transition Metals." Adv. Funct. Mater., vol. 27, 1605225, (2017), 10 pages.

(56) References Cited

OTHER PUBLICATIONS

Yuan, C. Z. et al. "Ultrathin Mesoporous $NiCo_2O_4$ Nanosheets Supported on Ni Foam as Advanced Electrodes for Supercapacitors." Adv. Funct. Mater., vol. 22, pp. 4592-4597, (2012), 6 pages.
Xu, C. et al. "An Ultrafast, High Capacity and Superior Longevity Ni/Zn Battery Constructed on Nickel Nanowire Array Film." Nano Energy, vol. 30, pp. 900-908, (2016), 26 pages.
Huang, Y. et al. "Magnetic-Assisted, Self-Healable, Yarn-Based Supercapacitor." ACS Nano, vol. 9, pp. 6242-6251, (2015), 10 pages.
Jimenez, V. M. et al. "The State of the Oxygen at the Surface of Polycrystalline Cobalt Oxide." J. Electron Spectrosc. Relat. Phenom., vol. 71, pp. 61-71, (1995), 11 pages.
Li, Y.G. et al. "Recent Advances in Zinc-Air Batteries." Chem. Soc. Rev., vol. 43, pp. 5257-5275, (2014), 19 pages.
See, D. M. et al. "Temperature and Concentration Dependence of the Specific Conductivity of Concentrated Solutions of Potassium Hydroxide." J. Chem. Eng. Data, vol. 42, pp. 1266-1268, (1997), 3 pages.
Xu, J. et al. "Flexible Asymmetric Supercapacitors Based Upon $Co_9S_8$ Nanorod//$Co_3O_4$@$RuO_2$ Nanosheet Arrays on Carbon Cloth." ACS Nano, vol. 7, pp. 5453-5462, (2013), 10 pages.
Yu, D. S. et al. "Controlled Functionalization of Carbonaceous Fibers for Asymmetric Solid-State Micro-Supercapacitors with High Volumetric Energy Density." Adv. Mater., vol. 26, pp. 6790-6797, (2014), 8 pages.
Xia, C. et al. "Highly Stable Supercapacitors with Conducting Polymer Core-Shell Electrodes for Energy Storage Applications." Adv. Energy, Mater., vol. 5, 1401805, (2015), 9 pages.
Sun, J. F. et al. "Assembly and Electrochemical Properties of Novel Alkaline Rechargeable Ni/Bi Battery Using $Ni(OH)_2$ and $(BiO)_4CO_3(OH)_2$ Microspheres as Electrode Materials." J. Power Sources, vol. 274, pp. 1070-1075, (2015), 6 pages.
Yesibolati, N. et al. "High Performance $Zn/LiFePO_4$ Aqueous Rechargeable Battery for Large Scale Applications." Electrochim. Acta, vol. 152, pp. 505-511, (2015), 7 pages.
Liu, N. S. et al. "Cable-Type Supercapacitors of Three-Dimensional Cotton Thread Based Multi-Grade Nanostructures for Wearable Energy Storage." Adv. Mater., vol. 25, pp. 4925-4931, (2013), 7 pages.
Tao, J. Y. et al. "Solid-State High Performance Flexible Supercapacitors Based on Polypyrrole-$MnO_2$-Carbon Fiber Hybrid Structure." Sci. Rep., vol. 3, 2286, (2013), 7 pages.
Guan, C. et al. "High-Performance Flexible Solid-State Ni/Fe Battery Consisting of Metal Oxides Coated Carbon Cloth/Carbon Nanofiber Electrodes." Adv. Energy Mater., vol. 6, 1601034, (2016), 9 pages.
Li, R. Z. et al. "Carbon-Stabilized High-Capacity Ferroferric Oxide Nanorod Array for Flexible Solid-State Alkaline Battery-Supercapacitor Hybrid Device with High Environmental Suitability." Adv. Funct. Mater., vol. 25, pp. 5384-5394, (2015), 11 pages.
Zhou, C. et al. "Construction of High-Capacitance 3D CoO@Polpyrrole Nanowire Array Electrode for Aqueous Asymmetric Supercapacitor." Nano Lett., vol. 13, pp. 2078-2085, (2013), 8 pages.
Lu, X. H. et al. "H—$TiO_2$@$MnO_2$//H—$TiO_2$@C Core-Shell Nanowires for High Performance and Flexible Asymmetric Super-Capacitors." Adv. Mater., vol. 25, pp. 267-272, (2013), 6 pages.
Yang, P.H. et al. "Low-Cost High-Performance Solid-State Asymmetric Supercapacitors Based on $MnO_2$ Nanowires and $Fe_2O_3$ Nanotubes." Nano Lett., vol. 14, pp. 731-736, (2014), 6 pages.
Zhu, C. R. et al. "All Metal Nitrides Solid-State Asymmetric Supercapacitors." Adv. Mater., vol. 27, pp. 4566-4571, (2015), 6 pages.
Yu, M. H. et al. "Holey Tungsten Oxynitride Nanowires: Novel Anodes Efficiently Integrate Microbial Chemical Energy Conversion and Electrochemical Energy Storage." Adv. Mater., vol. 27, pp. 3085-3091, (2015), 7 pages.
Zeng, Y. X. et al. "Advanced Ti-Doped $Fe_2O_3$@PEDOT Core/Shell Anode for High-Energy Asymmetric Super-Capacitors." Adv. Energy Mater., vol. 5, 1402176, (2015), 7 pages.
Lu, X. H. et al. "High Energy Density Asymmetric Quasi-Solid-State Supercapacitor Based on Porous Vanadium Nitride Nanowire Anode." Nano Lett., vol. 13, pp. 2628-2633, (2013), 6 pages.
Wang, X. F. et al. "Fiber-Based Flexible All-Solid-State Asymmetric Supercapacitors for Integrated Photodetecting System." Angew. Chem., Int. Ed., vol. 53, pp. 1849-1853, (2014), 5 pages.
Bae, J. et al. "Fiber Supercapacitors Made of Nanowire-Fiber Hybrid Structures for Wearable/Flexible Energy Storage." Angew. Chem. Int. Ed., vol. 50, pp. 1683-1687, (2011), 5 pages.
Chen, T. et al. "An Integrated "Energy Wire" for Both Photoelectric Conversion and Energy Storage." Angew. Chem., Int. Ed., vol. 51, pp. 11977-11980, (2012), 4 pages.
Ren, J. et al. "Twisting Carbon Nanotube Fibers for Both Wire-Shaped Micro-Supercapacitor and Micro-Battery." Adv. Mater., vol. 25, pp. 1155-1159, (2013), 5 pages.
Wu, X. C. et al. "High-Performance Aqueous Battery with Double Hierarchical Nanoarrays." Nano Energy, vol. 10, pp. 229-234, (2014), 6 pages.
Wang. H. L. et al. "An Ultrafast Nickel-Iron Battery from Strongly Coupled Inorganic Nanoparticle/Nanocarbon Hybrid Materials." Nat. Commun., vol. 3, 917, (2012), 8 pages.
Yoshima, K. et al. "Fabrication of Micro Lithium-Ion Battery with 3D Anode and 3D Cathode by Using Polymer Wall." J. Power Sources, vol. 208, pp. 404-408, (2012), 5 pages.
El-Kady, M. F. et al. "Laser Scribing of High-Performance and Flexible Graphene-Based Electrochemical Capacitors." Science. vol. 335, pp. 1326-1330, (2012), 5 pages.
Yifan, X. et al. "An All-Solid-State Fiber-Shaped Aluminum-Air Battery with Flexibility, Stretchability, and High Electrochemical Performance." Angew, Chem. Int. Ed., vol. 55, pp. 7979-7982, (2016), 4 pages.
Zhang, Y. et al. "Advances in Wearable Fiber-Shaped Lithium-Ion Batteries." Adv. Mater., vol. 28, pp. 4524-4531, (2016), 8 pages.
Weng, W. et al. "Smart Electronic Textiles." Angew. Chem. Int. Ed., vol. 55, pp. 6140-6169, (2016), 30 pages.

\* cited by examiner

GEL POLYMER ELECTROLYTES COMPRISING ELECTROLYTE ADDITIVE

CROSS-REFERENCE TO RELATED APPLICATIONS

The present application is a continuation-in-part of and claims priority to co-pending and commonly assigned U.S. patent application Ser. No. 15/805,817 entitled "RECHARGEABLE ZINC-ION BATTERIES HAVING FLEXIBLE SHAPE MEMORY" filed Nov. 7, 2017, the disclosure of which is hereby incorporated herein by reference. The present application is related to co-pending and commonly assigned U.S. patent application Ser. No. 15/805,779 entitled "RECHARGEABLE POLYACRYLAMIDE BASED POLYMER ELECTROLYTE ZINC ION BATTERIES" filed Nov. 7, 2017, and Ser. No. 15/896,961 entitled "CONDUCTIVE YARN-BASED NICKEL-ZINC TEXTILE BATTERIES," filed Feb. 14, 2018, the disclosures of which are hereby incorporated herein by reference.

TECHNICAL FIELD

The present invention relates generally to energy-storage technologies and, more particularly, to gel polymer electrolytes comprising electrolyte additive, such as for use in rechargeable Zinc-ion batteries.

BACKGROUND OF THE INVENTION

Renewable and clean energy in various forms, such as solar energy, wind energy, and electrochemical energy, is becoming increasingly important due to the pressure from both the environment and the human society. To this end, different types of energy storage and conversion devices, such as solar cells, fuel cells, thermoelectric generators, electrochemical supercapacitors, and rechargeable batteries, have been proposed and fabricated for facilitating energy utilization in a more sustainable and efficient way.

Compared with other types of renewable energy storage or conversion devices, electrochemical energy storage devices provide more reliable and stable energy output as well as ease of fabrication facilitating their large scale production. As a result, rechargeable batteries among all the electrochemical energy storage devices have been intensively investigated in the recent years. Accordingly, many different types of battery systems have been proposed, such as lithium-ion (Li-ion) batteries and sodium-ion (Na-ion) batteries which offer higher energy density as compared with supercapacitors. Among the various battery systems proposed, zinc-ion (Zn-ion) batteries, produced primarily from zinc (Zn) and manganese dioxide ($MnO_2$), have received increased attention due to their safe nature resulting from the aqueous electrolyte and the stable Zn metal anode material utilized.

Conventionally, electrochemical based batteries feature an architecture in which two electrodes are separated by an electrolyte. In the quest for advancing current battery technologies, gel electrolytes have attracted increasing attention. In particular, gel electrolytes have received interest due to the capability of gel electrolytes to fulfill multiple roles of electrolyte, separator, and binder in solid-state aqueous batteries. Generally, gel electrolytes are made of a polymeric material as matrix and an electrolyte salt to provide mobile ions. An ideal gel electrolyte generally requires a combination of advantages of high ion migration rate, reasonable mechanical strength, and robust water retention ability at the solid state for ensuring excellent work durability. However, previous gel electrolytes typically have conductivities that are lower than those of liquid electrolytes. Accordingly, the development of aqueous polymeric gel electrolytes remains at a preliminary stage and significant work remains with respect to exploring the inner electrochemical mechanism.

BRIEF SUMMARY OF THE INVENTION

The present invention is directed to systems and methods which provide an aqueous gel polymer electrolyte having one or more additive therein selected to configure the aqueous gel polymer electrolyte, and batteries formed therewith, for improved performance. Aqueous gel polymer electrolytes may, for example, have an additive therein selected to configure batteries formed using the aqueous gel polymer electrolyte to increase the ionic conductivity of the gel polymer electrolyte.

An aqueous gel polymer electrolyte having an additive, therein selected to configure batteries for improved performance according to embodiments of the present invention may comprise an electrolyte additive compound including boron, such as a borate ion-containing salt (e.g., including borax, potassium tetraborate, etc.) or boric acid, wherein a rechargeable Zinc-ion battery having improved electrochemical performance may be formed from the aqueous gel electrolyte including the electrolyte additive. The addition of an electrolyte additive compound including boron of embodiments in Zinc-ion battery gel electrolytes is, for example, configured to enhance the dissociation of zinc ions and anions, and subsequently release more mobile zinc ions. Furthermore, the interaction between an electrolyte additive compound including boron of embodiments and divalent transition metal (Zn) in electrolyte may enhance the transportation of mobile zinc ions. Accordingly, the electrochemical performances of rechargeable Zinc-ion batteries may be improved at all levels based on the optimized electrolyte material of embodiments herein. The gel electrolytes of embodiments facilitates the evolution of solid-state batteries from traditional sandwich-type batteries, to flexible, transparent, and/or planar batteries (e.g., microbatteries), and thus offering power support to flexible and even transparent electronics.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Electrochemical rechargeable energy storage devices may provide a suitable source of energy in a number of emerging areas. For example, Zinc-ion (Zn-ion) rechargeable batteries, produced primarily from zinc (Zn) and manganese dioxide ($MnO_2$), provide an attractive energy storage platform due to their safe nature resulting from their use of aqueous electrolyte and stable Zn metal anode material. Embodiments of the present invention provide gel polymer electrolytes comprising electrolyte additive, such as for use in the above mentioned rechargeable Zinc-ion batteries.

Figure 1:
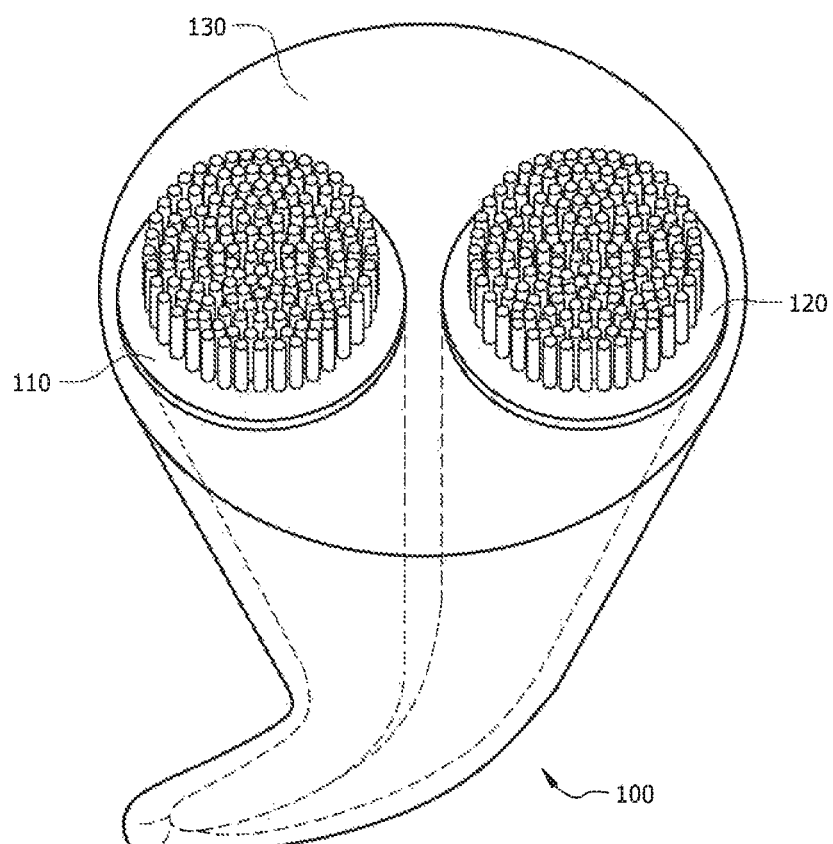
FIG. 1 shows an exemplary Zn-ion battery implementation comprising gel polymer electrolyte with electrolyte additive according to embodiments of the present invention.

FIG. 1 shows an exemplary Zn-ion battery implementation according to embodiments of the present invention. In particular, Zn-ion battery 100 of the embodiment illustrated in FIG. 1 comprises anode 110, cathode 120, and electrolyte 130 provided in a cooperative relationship operative to function as a rechargeable energy storage device.

Anode 110 and cathode 120 may, for example, be comprised of various materials, such as flexible conductive yarns (e.g., stainless steel yarn, carbon nanotube (CNT), Nickel-Titanium-based alloy wire, etc.), in various shapes and sizes coated (e.g., using an electrodeposition process) with a suitable material to provide electrodes for a flexible Zn-ion battery configuration. For example, anode 110 may comprise one of the above mentioned conductive materials providing a current collector coated with a zinc material (e.g., zinc, zinc alloy, zinc composites, etc.). Correspondingly, cathode 120 may comprise one of the above mentioned conductive materials providing a current collector coated with a manganese oxide ($MnO_x$) (e.g., manganese dioxide ($MnO_2$), such as in the form of $MnO_2$ nanocrystallines) which can store and release zinc ions (e.g., $Zn^{2+}$ ions). Accordingly, embodiments of Zn-ion battery 100 may provide a rechargeable Zn—$MnO_x$ battery configuration. It should be appreciated that, although the zinc materials of anode 110 may provide very good conductivity, the $MnO_x$ based material of cathode 120 of embodiments suffers from relatively low conductivity, thus potentially resulting in poor energy storage performance. Thus, embodiments of the present invention introduce a conductive polymer, such as polypyrrole (PPy), as both a binder and conductive additive with respect to the aforementioned coating of cathode 120.

Electrolyte 130 may be combined with the foregoing cathode and anode electrodes to provide a Zn-ion battery implementation in accordance with the concepts herein. For example, electrolyte 130 may comprise an aqueous electrolyte, such as a polymer gel electrolyte having an additive therein selected to configure the battery for improved performance. Electrolyte 130 of embodiments may comprise an aqueous gel polymer electrolyte having an electrolyte additive compound including boron, such as a borate ion-containing salt (e.g., borax (e.g., sodium tetraborate decahydrate ($Na_2B_4O_7 \cdot 10H_2O$)), potassium tetraborate ($K_2B_4O_7$), etc.) and/or boric acid ($H_3BO_3$), included therein as an additive to configure Zinc-ion battery 100 for improved electrochemical performance. The use of borax as the above mentioned borate ion-containing salt of the electrolyte additive in accordance with the concepts herein is very cost effective and is environmentally friendly and a readily reproducible natural resource.

In accordance with embodiments of the invention, the addition of borax in Zinc-ion battery gel electrolytes enhances the dissociation of $Zn^{2+}$ and anions, and subsequently releases more mobile zinc ions. Furthermore, the interaction between borax and divalent transition metal (Zn) in electrolyte according to embodiments enhances the transportation of mobile zinc ions. Accordingly, the electrochemical performance of Zinc-ion battery 100 is improved at all levels based on the optimized material of electrolyte 130 including the borax additive in accordance with embodiments herein.

Figure 2:
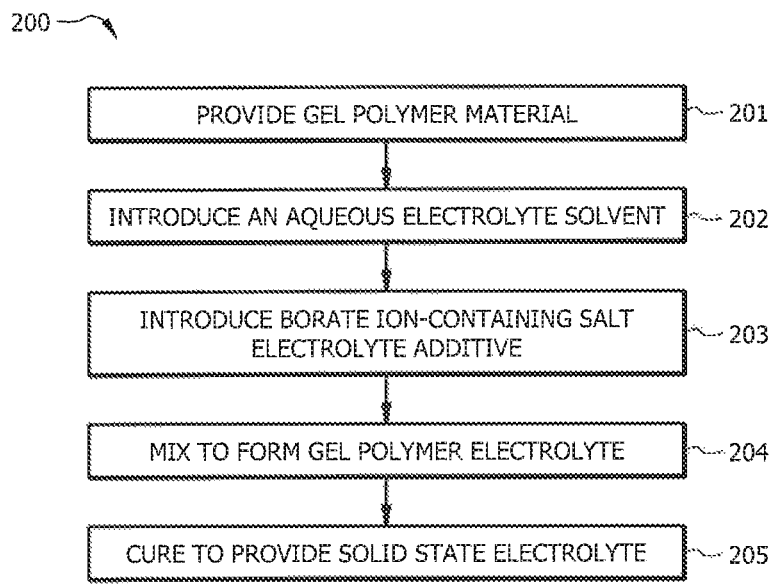
FIG. 2 shows a method for forming a gel polymer electrolyte comprising electrolyte additive according to embodiments of the present invention.

Directing attention to FIG. 2, a method for forming a gel polymer electrolyte comprising electrolyte additive, such as may provide embodiments of electrolyte 130 above, is shown. In accordance with flow 200 illustrated in FIG. 2, electrolyte 130 of embodiments comprises an aqueous gel polymer electrolyte formed from an aqueous electrolyte solvent, a polymer matrix having dispersed therein a zinc salt solvent, and one or more electrolyte additive including a borate ion-containing salt.

In accordance with the foregoing, at block 201 of the illustrated embodiment of flow 200 gel polymer material is provided for forming an aqueous gel polymer as a gel base for the gel polymer electrolyte. For example, a suitable gel polymer may be obtained by mixing gel monomer, crosslinking agent, and initiator to form a polymer matrix. The polymer matrix of an aqueous gel polymer of embodiments may, for example, comprise one or more of polyethylene oxide (PEO), polypropylene oxide (PPO), polyvinyl alcohol (PVA), polyacrylamide (PAM), polyacrylonitrile (PAN), polymethyl methacrylate (PMMA), polyacrylic acid (PAA), gelatin, and/or starch.

An aqueous electrolyte solvent is introduced with respect to the gel polymer for forming an aqueous gel polymer electrolyte at block 202 illustrated in FIG. 2. The aqueous electrolyte solvent of embodiments may, for example, comprise at least one divalent zinc salt (e.g., a zinc salt solution having a concentration of 0.2-3 M). Additionally or alternatively, the aqueous electrolyte solvent may comprise at least one bivalent manganous salt (e.g., a manganous salt solution having a concentration of 0.05-0.5 M).

An electrolyte additive compound including boron, such as a borate ion-containing salt and/or boric acid, is introduced with respect to the gel polymer for forming an aqueous gel polymer electrolyte having improved performance due to increased ionic conductivity of the gel polymer electrolyte at block 203 of the embodiments illustrated in FIG. 2. The electrolyte additive compound including boron may, for example, comprise a borate ion-containing salt electrolyte additive, such as sodium tetraborate decahydrate ($Na_2B_4O_7 \cdot 10H_2O$). For example, sodium tetraborate decahydrate in an amount of 0.2 wt % to 1 wt % based on the total amount of the aqueous gel polymer electrolyte may be provided in accordance with embodiments of the invention.

At block 204 of the illustrated embodiment, the gel polymer, aqueous electrolyte solvent, and electrolyte additive compound including boron are mixed to form electrolyte 130 of embodiments herein. For example, the gel polymer, aqueous electrolyte solvent, and electrolyte additive may be mixed until all ingredients are totally dissolved, as may be indicated by obtaining a clear solution. For some gel polymers which are hardly dissolved in cold water (e.g., gelatin), mixing may be performed under heating (e.g., 80° C. for gelatin).

It should be appreciated that the functions of low 200 set forth with respect to blocks 201-204 of the illustrated embodiment may be combined and/or performed in an order different than that of the example. For example, the functions of block 201-204 may be implemented in a process for synthesis of gel polymer electrolyte wherein gelatin powders of a gel polymer are added to an aqueous electrolyte (e.g., 4 g gelatin powders added in 40 mL 1 M $ZnSO_4$ solution), wherein an electrolyte additive compound including boron (e.g., 0.2 g borax powders) is additionally added into the aqueous electrolyte solution for forming a gel polymer electrolyte with electrolyte additive. Thereafter, the solution may be heated (e.g., to 80° C.) under stirring until a clear solution of gel polymer electrolyte with borax additive is obtained. As can be appreciated from the foregoing, using compounds including boron as electrolyte additive according to embodiments need not introduce any significant extra processes in production of gel polymer electrolyte (e.g., introduction of a borax additive may be accomplished by adding an appropriate amount of a suitable borax material with the gel polymer and aqueous electrolyte materials when forming a gel polymer electrolyte).

The aqueous gel polymer electrolyte provided in accordance with techniques of flow 200 may be cured, such as at room temperature or high temperature, to form a solid state electrolyte at block 205 of the illustrated embodiment of flow 200. In accordance with embodiments of the invention, anode 110, cathode 120, and electrolyte 130 comprising a gel polymer electrolyte produced using the foregoing exemplary technique may be combined to produce a Zinc-ion battery implementation. For example, anode 110 may be encapsulated with a portion of the gel polymer electrolyte of electrolyte 130 and cathode 120 may likewise be encapsulated with a portion of the gel polymer electrolyte of electrolyte 130, wherein the encapsulated anode and encapsulated cathode may be disposed adjacent to each other to form an embodiment of Zn-ion battery 100. The combination of anode 110 and cathode 120 each encapsulated by electrolyte 130 acting as a separator may further be encapsulated with the gel polymer electrolyte of electrolyte 130 as a binder. Thereafter, electrolyte 130 may be cured as described above to form a solid-state implementation of Zn-ion battery 100.

Figure 3:
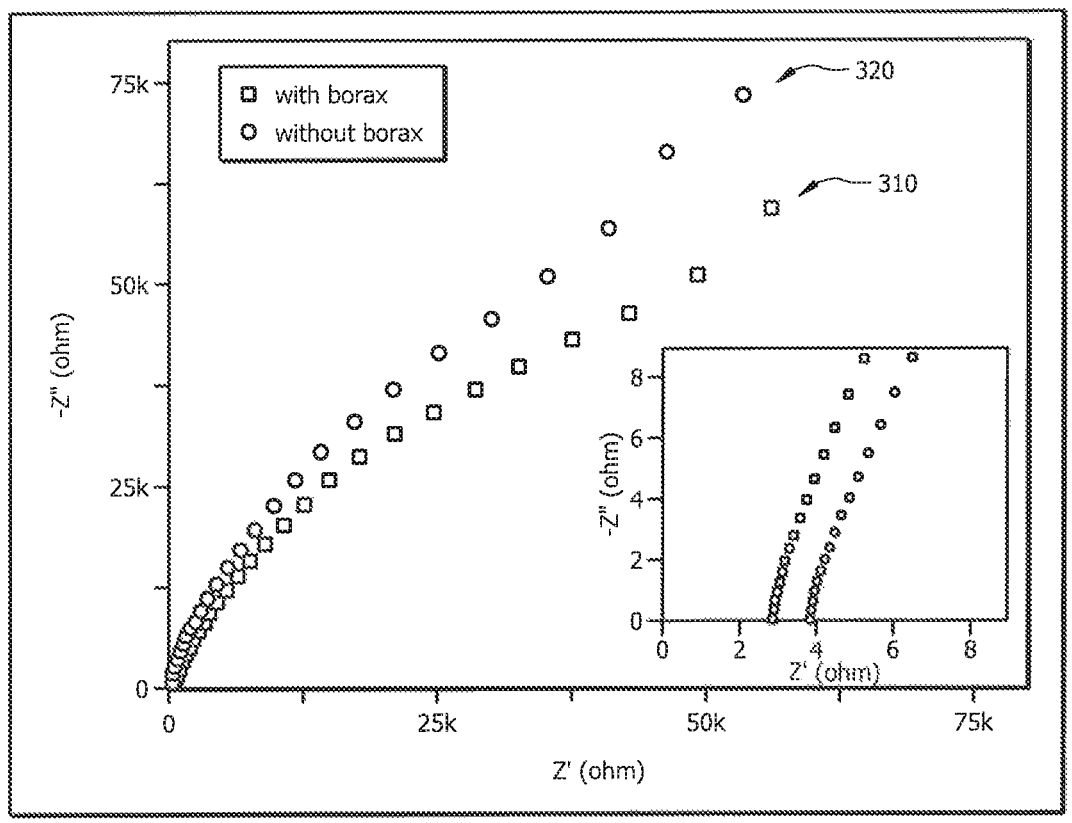
FIG. 3 shows the Nyquist plot of an exemplary gel polymer electrolyte with borax additive and without borax additive.

The use of an electrolyte additive compound including boron in an aqueous gel electrolyte according to embodiments of the invention increases the number of mobile zinc ions in the electrolyte and enhances the transportation of mobile zinc ions in electrolyte. The effects of the addition of borax enhancing the ionic conducting performance of gel polymer electrolytes may be seen in the graphs of FIG. 3. In particular, FIG. 3 shows the Nyquist plot of an exemplary gel polymer electrolyte with borax additive (graph 310) and without borax additive (graph 320), wherein the inset shows magnification of the range between 0-9Ω. In the example implementation from which the data of graphs 310 and 320 were derived, two pieces of stainless steel sheets were utilized as electrodes. It was observed that, in middle frequency range, the gel polymer electrolyte with borax exhibits faster charge transference than that of the gel polymer electrolyte without borax. This indicates that the addition of borax will enhance the mobility of zinc ions in the electrolyte. A comparison of graph 310 (gel polymer electrolyte with borax additive) and graph 320 (gel polymer electrolyte without borax additive) reveals that the ionic conductivity of the exemplary gel polymer electrolyte increases more than 27% after adding borax. In particular, the first intersection point with real axis of the gel polymer electrolyte with borax is 27% smaller than that of the gel polymer electrolyte without borax. Accordingly, considering the identical dimension and thickness of the electrolytes, the ionic conductivity of the gel polymer electrolyte with borax is 27% higher than that of the gel polymer electrolyte without borax. Accordingly, compared to the existing technology, the ionic conductivity of a gel polymer electrolyte increases more than 27% after adding borax in accordance with concepts herein, thus resulting in better electrochemical performances of Zinc-ion rechargeable batteries formed using such gel polymer electrolytes with borax additive.

Figure 4A:
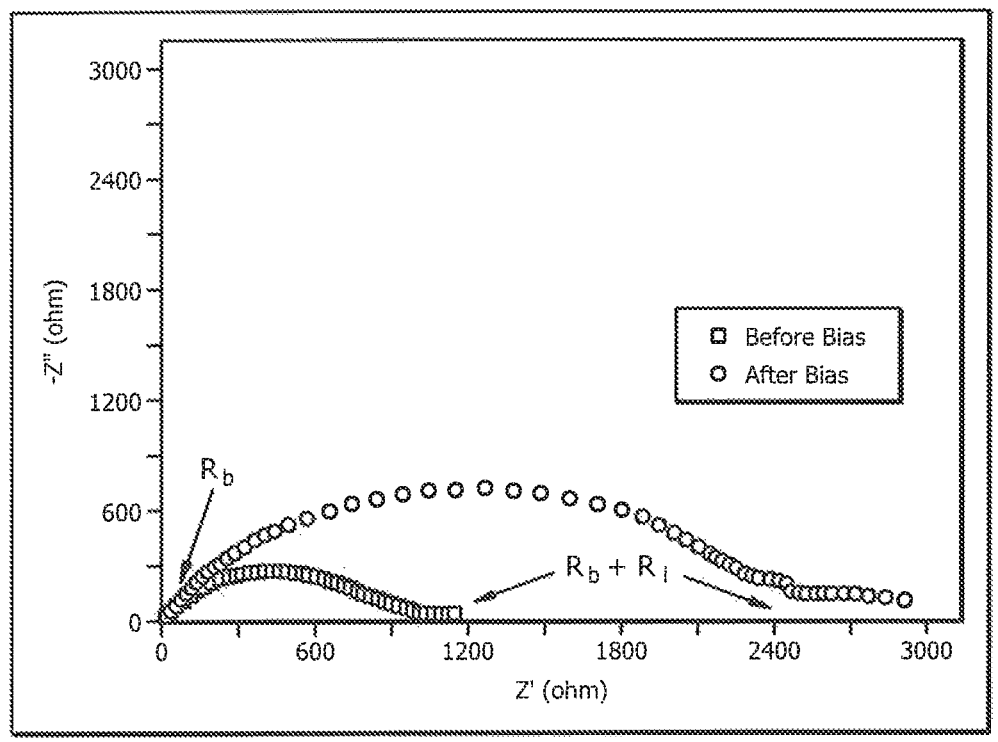
FIGS. 4A and 4B showing the Nyquist plot of exemplary gel polymer electrolyte with borax additive and without borax additive.
Figure 4B:
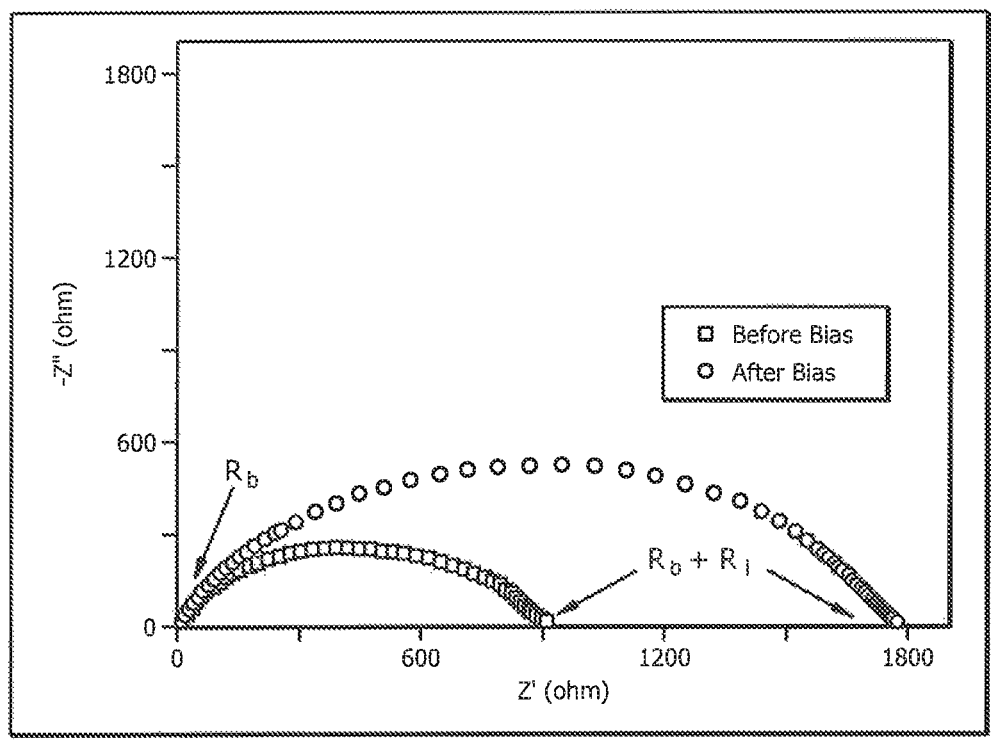

Analysis of ion transference with respect to $Zn^{2+}$ ions (see Y. Y. Lu, M. Tikekar, R, Mohanty, K. Hendrickson, L. Ma, L. A. Archer, Stable Cycling of Lithium Metal Batteries Using High Transference Number Electrolytes, *Adv. Energy Mater.* 5, 1402073 (2015) and W. Liu, S. W, Lee, D. C. Lin, F. F. Shi, S. Wang, A. D, Sendek, Y. Cui, Enhancing ionic conductivity in composite polymer electrolytes with well-aligned ceramic nanowires. *Nat. Energy* 2, 17035 (2017), the disclosures of which are incorporated herein by reference) is helpful in understanding the enhanced ionic conductivity provided by embodiments of a borax additive according to embodiments. The $Zn^{2+}$ transference number of gel polymer electrolyte with and without borax may be derived in accordance with the following equation:

$$t_{Zn^{2+}} = \frac{1}{2} \frac{I^s}{I^0} \frac{\Delta V - I^U R_i^0}{\Delta V - I^S R_i^S} \qquad (1)$$

where $I^s$ and $I^0$ are the currents in the polarized and unpolarized states respectively, $\Delta V$ is the potential difference (50 mV) used in test, and $R_i$ is the interfacial resistance. $R_i$ may be derived from the impedance spectra shown in FIGS. 4A and 4B showing the Nyquist plot of exemplary gel polymer electrolyte with borax additive and without borax additive, wherein the exemplary gel polymer electrolyte is sandwiched by two zinc foils and the potential bias (50 mV) applied. Curves 401 (i.e., 401a in FIG. 4A and 401b in FIG. 4B)) are measured at initial state. Curves 402 (i.e., 402a in FIG. 4A and 402b in FIG. 4B) are measured after applying a small voltage bias (50 mV) on the cell for 1500 s. For both impedance spectra, the first intersection point with real axis is originated from the bulk resistance ($R_b$). The second intersection point is the sum of the bulk and interfacial resistance ($R_b+R_i$). Therefore, the interfacial resistance ($R_i$) is obtained by subtracting value of $R_b$ from $R_b+R_i$.

Figure 5:
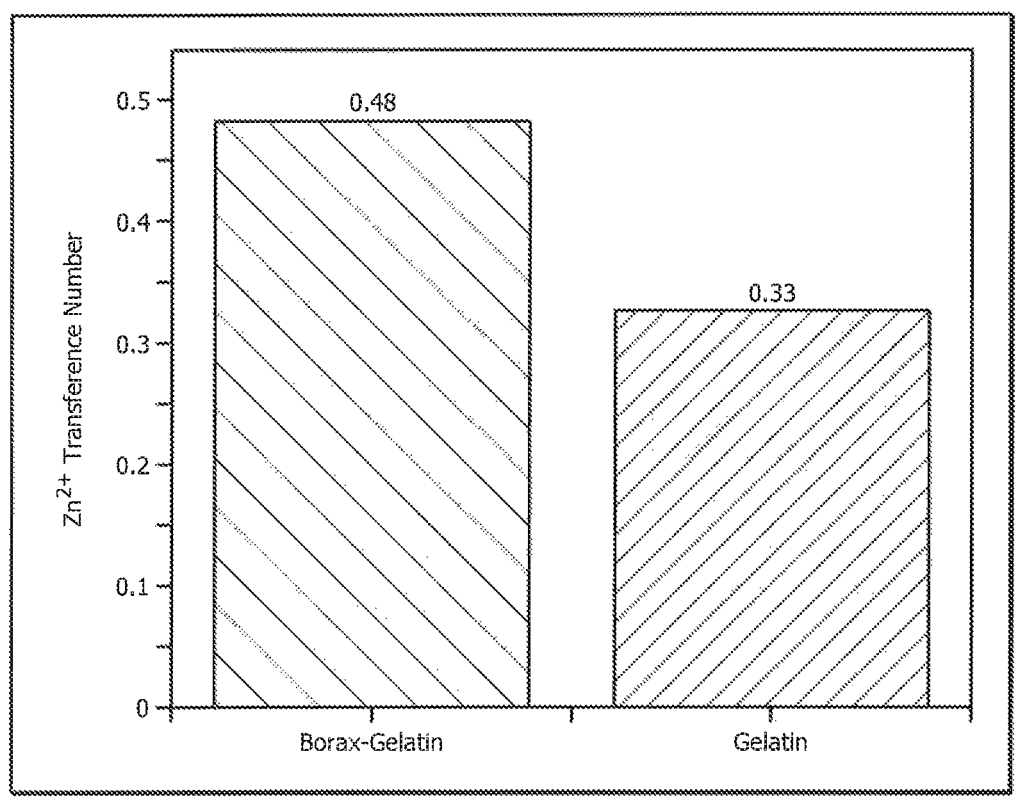
FIG. 5 shows a comparison of the zinc ion transference number for exemplary gel polymer electrolyte with borax additive and gel polymer electrolyte without borax additive.

FIG. 5 shows a comparison of the zinc ion transference number for the foregoing exemplary gel polymer electrolyte with borax additive and gel polymer electrolyte without borax additive. As can be seen from the graphs of FIG. 5, the $Zn^{2+}$ transference number increases about 45% (from 0.33 to 0.48) after adding the borax into the gel polymer electrolyte.

Figure 6A:
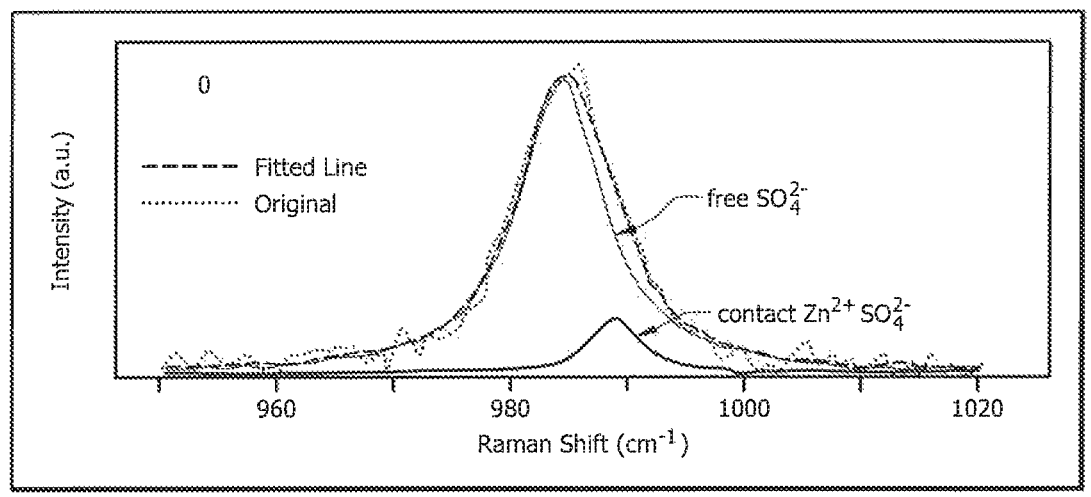
FIGS. 6A and 6B show the Raman spectra of exemplary gel polymer electrolyte with borax additive and without borax additive.
Figure 6B:
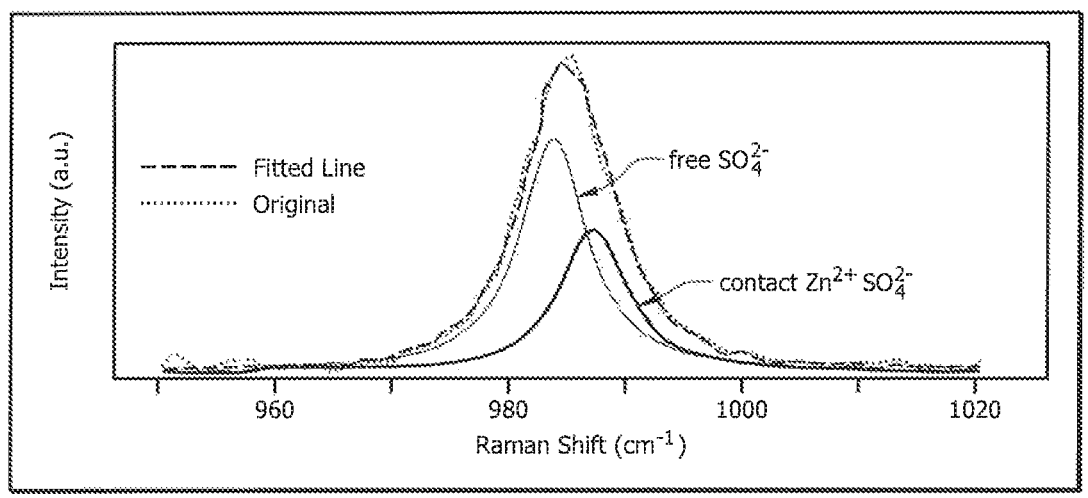

FIGS. 6A and 6B show the Raman spectra of the exemplary gel polymer electrolyte with borax additive (FIG. 6A) and without borax additive (FIG. 6B). As can be seen in FIGS. 6A and 6B, two bands centered at 983.6 and 987.1 $cm^{-1}$ are assigned to free anions ($SO_4^{2-}$) that do not directly interact with $Zn^{2+}$ and contact ion pairs of $Zn^{2+}SO_4^{2-}$, respectively (see A. C. Hayes, P. Kruus, W. A. Adams, Raman-Spectroscopic Study of Aqueous (Nh4)2so4 and Znso4 Solutions. *J. Solution Chem.* 13, 61-75 (1984), the disclosure of which is incorporated herein by reference). This reveals that the addition of a borax additive to the gel polymer electrolyte results in the increase of free anions together with the decrease of the contact ion pairs, indicating that borax will enhance the dissociation of $Zn^{2+}$ and $SO_4^{2-}$, and subsequently release more mobile zinc ions. The increased number of mobile zinc ions could be attributed to the reduction of crystallinity of gelatin by adding borax. Furthermore, the interaction between borax and divalent transition metal (Zn) in electrolyte could enhance the transportation of mobile zinc ions (see N. A. Choudhury, S. Sampath, A. K. Shukla, Hydrogel-polymer electrolytes for electrochemical capacitors: an overview. *Energ. Environ, Sci.* 2, 55-67 (2009), the disclosure of which is incorporated herein by reference).

Figure 7:
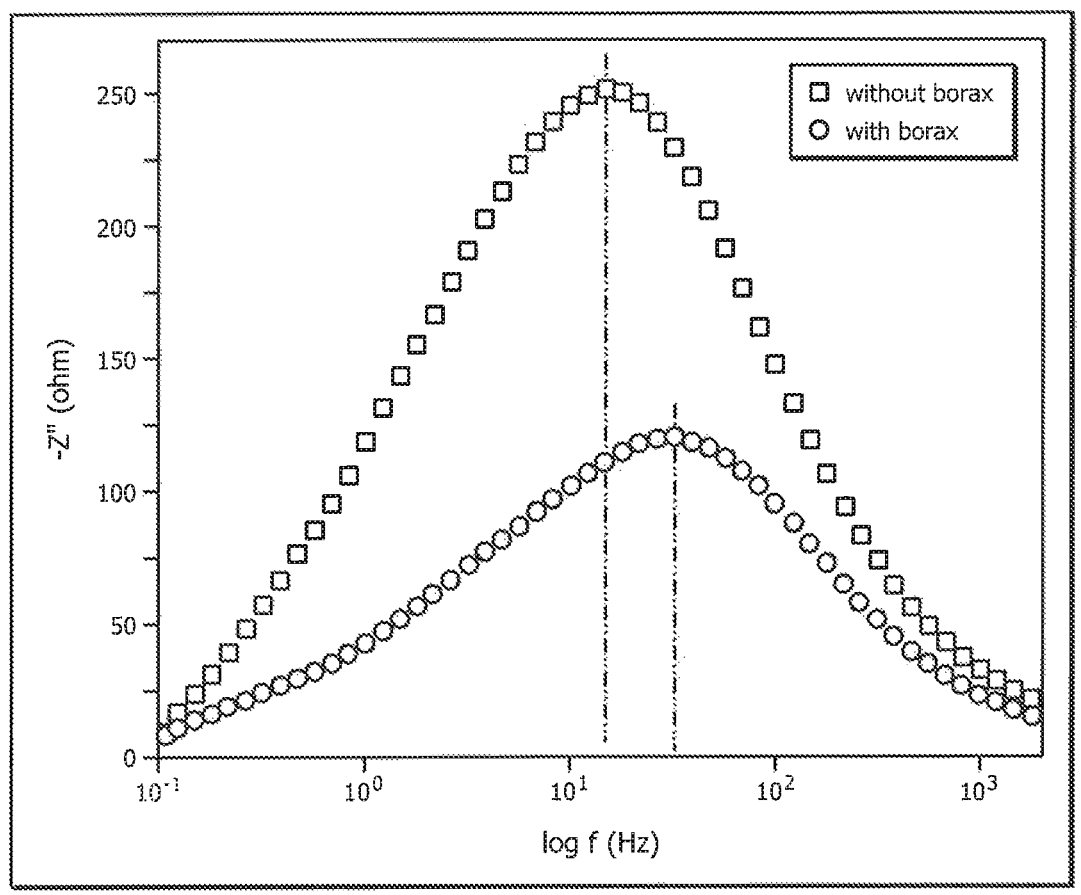
FIG. 7 shows the imaginary impedance of exemplary gel polymer electrolyte with borax additive and without borax additive.

For further investigate the mechanism of zinc-ion transportation, FIG. 7 shows the imaginary impedance of the exemplary gel polymer electrolyte with borax additive and without borax additive. In particular, the imaginary impedance is plotted as a function of frequency (Debye plot) and fitted with a Lorentzian function in FIG. 7. As may be seen from the graphs of FIG. 7, the frequency of peak maxima, which is associated with the conductivity relaxation of the electrolyte, shifts toward higher frequencies on adding borax, implying a faster ion conduction introduced by borax (see W. Liu, D. C. Lin, Sun, G. M. Zhou, Y. Cui, Improved Lithium Ionic Conductivity in Composite Polymer Electrolytes with Oxide-Ion Conducting Nanowires. *ACS Nana* 10, 11407-11413 (2016), the disclosure of which is incorporated herein by reference).

As can be appreciated from the foregoing, embodiments of the present invention provide a relatively inexpensive, environmentally friendly additive for high ion conductive polymer electrolyte. Application of embodiments of the present invention provide a gel polymer electrolyte configuration in which a borax additive is utilized to facilitate increased ionic conductivity of aqueous gel polymer electrolyte for Zinc-ion battery implementations, whereby the electrochemical performances of solid-state aqueous Zinc-ion rechargeable batteries are improved. Zinc-ion rechargeable battery configurations using borax as an electrolyte additive for aqueous gel polymer electrolyte according to the concepts herein remain stable for a long period of time, provide high energy density, low cost, and comprise a commercially viable energy storage solution.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An aqueous gel polymer electrolyte comprising:
   an aqueous electrolyte solvent including at least one of a divalent zinc salt having a concentration of 0.2-3 M or a bivalent manganous salt solution having a concentration of 0.05-0.5 M;
   a crosslinked polymer matrix, the crosslinked polymer matrix having a zinc salt solvent dispersed therein, wherein the aqueous electrolyte solvent is introduced into the crosslinked polymer matrix and forms an aqueous gel polymer; and
   an electrolyte additive compound configured to increase ionic conductivity of the aqueous gel polymer electrolyte, wherein the electrolyte additive compound comprises sodium tetraborate decahydrate ($Na_2B_4O_7.10H_2O$), wherein the electrolyte additive compound is introduced into the aqueous gel polymer and forms the aqueous gel polymer electrolyte.

2. The aqueous gel polymer electrolyte of claim 1, wherein the aqueous electrolyte solvent comprises at least one bivalent manganous salt, wherein the bivalent manganous salt solution has a concentration of 0.05-0.5 M.

3. The aqueous gel polymer electrolyte of claim 1, wherein the crosslinked polymer matrix comprises at least one polymer selected from the group consisting of:
   polyethylene oxide (PEO);
   polypropylene oxide (PPO);
   polyvinyl alcohol (PVA);
   polyacrylamide (PAM);
   polyacrylonitrile (PAN);
   polymethyl methacrylate (PMMA);
   polyacrylic acid (PAA);
   gelatin; and
   starch.

4. A rechargeable Zinc-ion battery comprising:
   a cathode;
   an anode; and
   an aqueous gel polymer electrolyte comprising a crosslinked polymer matrix comprising an aqueous gel polymer, an aqueous electrolyte solvent including at least one of a divalent zinc salt and a bivalent manganous salt dispersed in the aqueous gel polymer, and an electrolyte additive compound including boron, wherein the electrolyte additive compound comprises tetraborate decahydrate ($Na_2B_4O_7.10H_2O$) and the electrolyte additive compound is configured to increase ionic conductivity of the aqueous gel polymer electrolyte.

5. The rechargeable Zinc-ion battery of claim 4, wherein the rechargeable Zinc-ion battery is a rechargeable Zn—$MnO_x$ battery.

6. The rechargeable Zinc-ion battery of claim 5, wherein the cathode comprises a current collector coated with a manganese dioxide ($MnO_2$) material and one or more binders.

7. The rechargeable Zinc-ion battery of claim 5, wherein the anode comprises a current collector coated with a zinc material.

8. The aqueous gel polymer electrolyte of claim 1, wherein the crosslinked polymer matrix comprises a gel monomer, crosslinking agent, and initiator mixed to form the crosslinked polymer matrix.

9. The aqueous gel polymer electrolyte of claim 1, wherein the crosslinked polymer matrix comprises gelatin, and wherein the electrolyte additive compound reduces a crystallinity of the gelatin.

10. The aqueous gel polymer electrolyte of claim 1, wherein the aqueous gel polymer electrolyte is formed via steps including:

mixing gel monomer, crosslinking agent, and initiator with aqueous electrolyte solvent for forming an aqueous gel polymer electrolyte mixture;

including an electrolyte additive compound including boron in the aqueous gel polymer electrolyte mixture to provide the aqueous gel polymer electrolyte having the electrolyte additive compound therein; and curing the aqueous gel polymer electrolyte having the electrolyte additive compound therein.

11. The aqueous gel polymer electrolyte of claim 10, wherein the gel monomer, crosslinking agent, and initiator form the crosslinked polymer matrix.

12. The aqueous gel polymer electrolyte of claim 1, wherein the aqueous gel polymer electrolyte comprises 0.2 w % to 1 wt % tetraborate decahydrate ($Na_2B_4O_7 \cdot 10H_2O$).

* * * * *